US012576511B2

(12) United States Patent
Zhao et al.

(10) Patent No.: US 12,576,511 B2
(45) Date of Patent: Mar. 17, 2026

(54) OVERSPRAY-FREE ROBOTIC PAINT SYSTEM INCLUDING FIXTURE LIFTING, POSITIONING, AND ORIENTING ROBOTS

(71) Applicant: GM GLOBAL TECHNOLOGY OPERATIONS LLC, Detroit, MI (US)

(72) Inventors: Xiang Zhao, Novi, MI (US); Hua-tzu Fan, Troy, MI (US); John Patrick Spicer, Plymouth, MI (US); Miguel Arturo Saez, Clarkston, MI (US); Jorge F. Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 531 days.

(21) Appl. No.: 17/970,096

(22) Filed: Oct. 20, 2022

(65) Prior Publication Data

US 2024/0131687 A1 Apr. 25, 2024
US 2024/0227166 A9 Jul. 11, 2024

(51) Int. Cl.
B25J 9/00 (2006.01)
B05B 12/14 (2006.01)
B05B 13/02 (2006.01)
B05B 13/04 (2006.01)
B25J 9/16 (2006.01)
B25J 11/00 (2006.01)

(52) U.S. Cl.
CPC .............. B25J 9/0093 (2013.01); B05B 12/14 (2013.01); B05B 13/0221 (2013.01); B05B 13/0452 (2013.01); B25J 9/0084 (2013.01);

B25J 9/1641 (2013.01); B25J 9/1697 (2013.01); B25J 11/0075 (2013.01)

(58) Field of Classification Search
USPC .................. 118/323, 321, 500, 712, 683, 692
See application file for complete search history.

(56) References Cited

U.S. PATENT DOCUMENTS

| | | | |
|---|---|---|---|
| 8,397,662 B2 * | 3/2013 | Herre | B25J 9/0084 901/43 |
| 9,192,953 B2 * | 11/2015 | Hendricks, Sr. | B05B 12/30 |
| 2018/0009075 A1 * | 1/2018 | Maeda | B23Q 17/2476 |

(Continued)

FOREIGN PATENT DOCUMENTS

| | | |
|---|---|---|
| DE | 102013002412 A1 | 8/2014 |
| DE | 102016014944 A1 | 6/2018 |
| DE | 102019111760 A1 | 11/2020 |

(Continued)

OTHER PUBLICATIONS

English Translation WO-2019196754-A1 (Year: 2019).*

(Continued)

*Primary Examiner* — Yewebdar T Tadesse

(57) ABSTRACT

An overspray-free paint system includes: a paint robot including an overspray-free paint applicator; and a first fixture robot for lifting and orienting a fixture assembly relative to at least one of the paint robot and the overspray-free paint applicator, the fixture assembly configured to hold an object to be painted by the overspray-free paint applicator, the first fixture robot including a first gripper configured to grab a first portion of the fixture assembly, and the first fixture robot configured to lift and orient the fixture assembly via the first gripper.

12 Claims, 14 Drawing Sheets

(56) References Cited

U.S. PATENT DOCUMENTS

2020/0134860 A1* 4/2020 Haven .................. G06T 7/0004

FOREIGN PATENT DOCUMENTS

| EP | 1468791 | A1 | 10/2004 | | |
|----|---------|----|---------|---|---|
| EP | 2520374 | B1 | 1/2016 | | |
| EP | 3782772 | A1 | 2/2021 | | |
| WO | WO-2019196754 | A1 * | 10/2016 | .............. | B25J 5/007 |

OTHER PUBLICATIONS

English Translation EP-2520374-B1 (Year: 2012).*
German Office from counterpart DE1020231114948, dated Jan. 17, 2025.

* cited by examiner

OVERSPRAY-FREE ROBOTIC PAINT SYSTEM INCLUDING FIXTURE LIFTING, POSITIONING, AND ORIENTING ROBOTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle paint systems.

A vehicle body-in-white (BIW) paint system can include multiple paint booths. Each of the paint booths include multiple paint robots. A conveyor is used to move a BIW into and out of the paint booths. The BIW is mounted on a fixture that is held by the conveyor and moved along a conveyor line through each of the paint booths. The paint robots spray the BIW and overspray is drawn into a sludge tank located below the conveyor line in each of the paint booths. While in each of the paint booths, different areas of the BIW are painted respectively by the paint robots in that paint booth.

SUMMARY

An overspray-free paint system is disclosed and includes: a paint robot including an overspray-free paint applicator; and a first fixture robot for lifting and orienting a fixture assembly relative to at least one of the paint robot and the overspray-free paint applicator, the fixture assembly configured to hold an object to be painted by the overspray-free paint applicator, the first fixture robot including a first gripper configured to grab a first portion of the fixture assembly, and the first fixture robot configured to lift and orient the fixture assembly via the first gripper.

In other features, the overspray-free paint system further includes a control module configured to adjust at least one of position and operation of the overspray-free paint applicator based on feedback. The paint robot includes a vision system configured to at least one of monitor movement and painting of the overspray-free paint applicator and provide the feedback to the control module.

In other features, the paint robot includes a first control module. The first fixture robot includes a second control module configured to communicate with and synchronize timing with the first control module.

In other features, the first fixture robot is configured to adjust roll and pitch of the fixture assembly and the object such that surfaces of the object to be painted are horizontal and perpendicular to the overspray-free paint applicator when painted.

In other features, the overspray-free paint system further includes a second fixture robot configured to grab, position and orient the fixture assembly in cooperation with the first fixture robot.

In other features, the second fixture robot includes: a second gripper configured to grab a second portion of the fixture assembly; and a selective compliance device connected between an arm of the second fixture robot and the second gripper and configured to compensate for misalignment between the first gripper and the second gripper.

In other features, the paint robot provides six degrees-of-freedom movement of the overspray-free paint applicator.

The first fixture robot provides six degrees-of-freedom movement of the fixture assembly and the object.

In other features, the paint robot and the first fixture robot are configured to position and orient the overspray-free paint applicator and the fixture assembly to maintain the overspray paint applicator in a perpendicular arrangement relative to surfaces of the object being painted.

In other features, the object is at least one of a vehicle component and a body-in-white. The first fixture robot is configured to move the at least one of the vehicle component and the body-in-white in X, Y, Z directions relative to the paint robot and adjust roll, pitch and yaw of the at least one of the vehicle component and the body-in-white relative to a base of the first fixture robot.

In other features, the fixture assembly includes a side gripping extension. The first gripper is configured to grab the side gripping extension.

In other features, the fixture assembly includes slides and fixturing devices configured to clamp down the object to a fixture base of the fixture assembly.

In other features, the fixture assembly includes actuators configured to independently move the slides and the fixturing devices relative to the fixture base.

In other features, the overspray-free paint system further includes: a pump; and a control module configured to control operation of the pump to draw at last one of a gas or a vapor through the fixture assembly.

In other features, the fixture base includes at least one of a cavity and a channel for through which the at least one of the gas or the vapor pass is drawn via the pump.

In other features, an overspray-free paint system is provided and includes: a paint robot including an overspray-free paint applicator; a fixture assembly reconfigurable to clamp down different types of objects; and at least one fixture robot configured to grab, lift and orient the fixture assembly relative to at least one of the paint robot and the overspray-free paint applicator.

In other features, the fixture assembly includes: rails; slides configured to move along the rails; and fixturing devices configured to move along the slides and hold an object being painted.

In other features, the at least one fixture robot includes: a first fixture robot including a first gripper configured to grab a first portion of the fixture assembly; and a second fixture robot including a second gripper configured to grab a second portion of the fixture assembly. The first fixture robot and the second fixture robot are configured to operate in coordination to lift, position and orient the fixture assembly.

In other features, the paint robot, the first fixture robot, and the second fixture robot are in communication with each other and/or a remote monitoring station to synchronize and coordinate movements of the paint robot, the first fixture robot, and the second fixture robot.

In other features, the paint robot and the at least one fixture robot is configured to maintain a perpendicular relationship between a direction of paint flow out of the overspray-free paint applicator and a surface of an object being painted.

In other features, the at least one fixture robot is configured to maintain a perpendicular relationship between a direction of a gravitational field at the fixture assembly and a surface of an object being painted.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
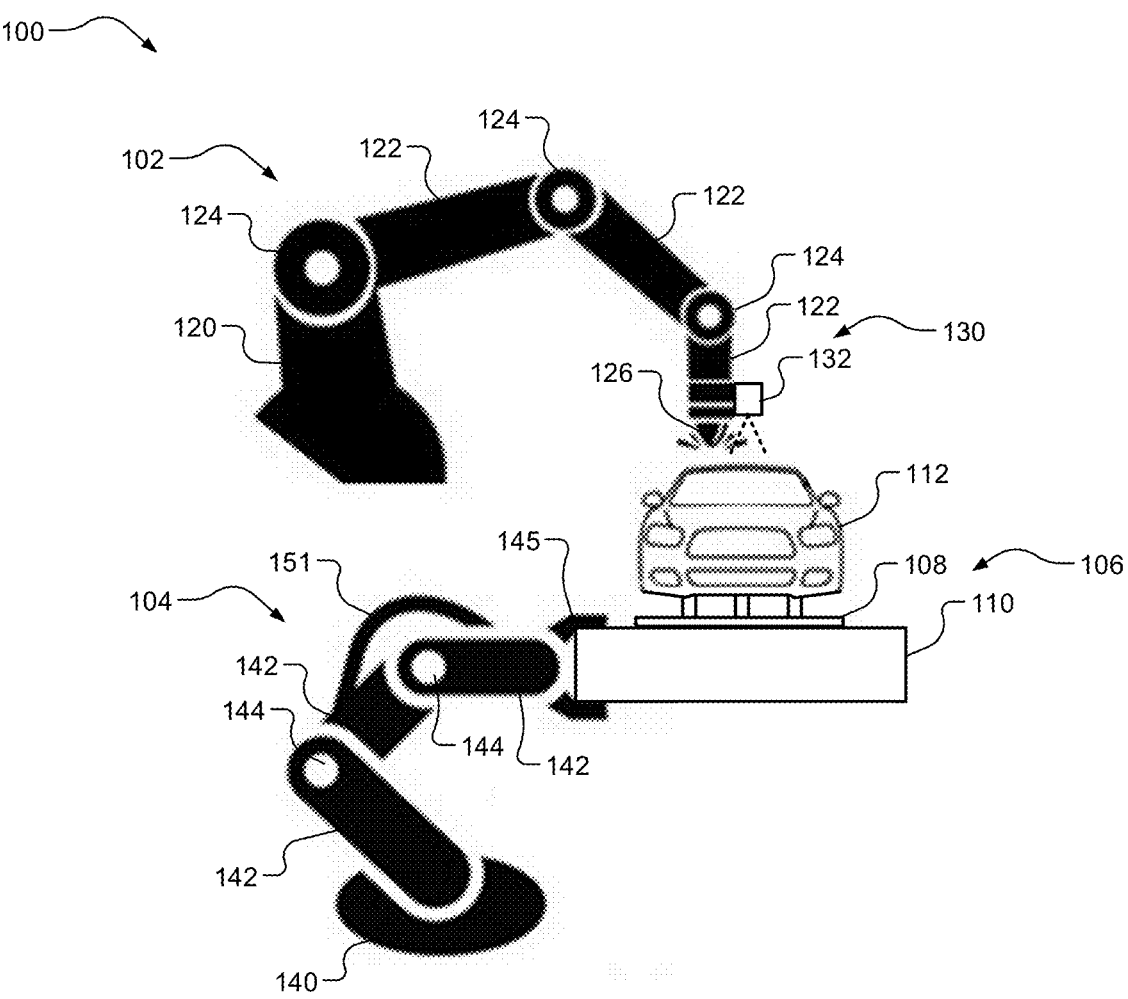
FIG. 1 is a front view of an example of an overspray-free paint system including a paint robot and a single fixture lifting and orienting robot in accordance with the preset disclosure.

An overspray-free paint system may include a carrier on which a vehicle BIW is mounted and a paint robot with an overspray-free paint applicator. The paint robot includes a paint applicator that is highly efficient and exhibits minimal to no overspray (e.g., less than 10% emissions as compared to traditional paint sprayers). The overspray-free paint system however can have two limitations. As a first example, an overspray-free system may have a carrier that is implemented as a conveyor, which carries and moves the vehicle BIW in and out of a paint booth. As another example, the overspray-free paint applicator is best suited for downward spraying in the direction of gravity. Hence the overspray-free paint system is limited to decorative painting applications to, for example, vehicle roofs, hoods and trunk lids, instead of entire vehicle BIW surfaces and/or other vehicle surfaces.

The examples set forth herein include overspray-free paint systems that are not limited to particular vehicle components and/or painting surfaces. The overspray-free paint systems disclosed herein include robotic lifter systems. The robot lifter systems include one or more lifting and orienting robots. The robots have bases that are in fixed locations, for example, mounted to a floor. The robots include grippers for grabbing, positioning and orienting fixtures. The fixtures are configured to hold objects (e.g., vehicles, BIWs of vehicles, etc.) while being painted by overspray-free paint applicators. The lifting and orienting robots are configured to position and orient objects such that surfaces being painted are in horizontal or near horizontal positions and overspray-free paint applicators are in vertical arrangements directing paint in a vertically downward direction. The lifting and orienting robots are able to move fixtures and objects to be painted into various orientations allowing for various surfaces of an object to be painted by using a single paint robot. The lifting and orienting robots may be used to paint all surfaces of an object via the single paint robot. The robots include robotic arms with grippers to grip the fixtures and provide various motions, such as up, down, pan, tilt, and rotate.

The disclosed fixtures may be either specific to a type of object being painted or may be reconfigurable with sets of locating and fixturing devices, such as pins, clamps, etc. As an example, the fixtures may be vehicle and/or BIW specific and include fixturing devices in a single fixed arrangement or the fixtures may be reconfigurable for different vehicles and/or different BIWs. When reconfigurable, the fixtures may include rails, slides, motors, etc. for moving fixturing devices to different locations relative to a fixture base to accommodate different sized and shaped objects being painted. The fixturing devices may be automatically moved to predetermined locations for each object. When painting a vehicle body, the fixturing devices are reconfigurable in real time for a footprint and size of the vehicle body using a fixturing scheme (or clamping arrangement) for the vehicle body.

FIG. 1 shows an overspray-free paint system 100 including a paint robot 102 and a lifting and orienting robot 104 configured to lift a single fixture assembly 106. The fixture assembly 106 may include a fixture 108 (e.g., a unibody fixture) that may be mounted on a fixture base 110. The fixture 108 may be configured for a single specific object (e.g., vehicle or BIW) or may be reconfigurable for various different objects (e.g., different vehicles and/or different BIWs). An example object 112 is shown in the form of a vehicle body.

The paint robot 102 includes a base 120, robot arms 122, motors 124 and an overspray-free paint applicator 126. The base 120 is in a fixed position, for example, mounted to a floor of a building. Not all of the motors 124 are shown. The paint applicator 126 is able to be moved in X, Y, and Z directions relative to the base 120 and rotated about X, Y, and Z axes providing 6-degrees-of-freedom movement of the paint applicator 126.

The paint robot 102 may further include a vision system 130 installed at the end of the paint robot 102 near the paint applicator 126. The vision system 130 may include one or more cameras (a single camera 132 is shown in FIG. 1). In one embodiment, a single camera is included. In another embodiment, two cameras are included. The cameras may be installed on the paint robot 102 forward of or rearward of the paint applicator 126 such that the cameras are monitoring a surface before and/or after application of paint. The cameras may view the surface being painted prior to, during and/or subsequent to painting of the surface. In an embodiment, a camera is located to view a surface before paint application to feedforward a path of the corresponding robot arm and paint applicator to a control module (e.g., the control module of the paint robot of FIG. 20). A camera located to view the surface after paint application may be used to feedback paint quality to the control module. The control module may adjust a paint process based on the feedback. The control module may monitor paint quality and send a "repair" command to the paint robot 102 to "touch up" paint where indicated. The paint robot 102 may then repaint and/or touch-up the area of concern.

The lifting and orienting robot 104 includes a base 140, robot arms 142, motors 144 and a gripper 145. The base 140 is in a fixed position, for example, mounted to a floor of a building. Not all of the motors 144 are shown. The gripper 145 is configured to grab and hold the fixture base 110. The lifting and orienting robot 104 is configured to lift and orient the fixture assembly 106 and one or more objects mounted to the fixture assembly 106. The fixture assembly 106 is able to be moved in X, Y, and Z directions relative to the base 140 and rotated about X, Y, and Z axes providing 6-degrees-of-freedom movement of the fixture assembly 106.

Figures 15, 16:
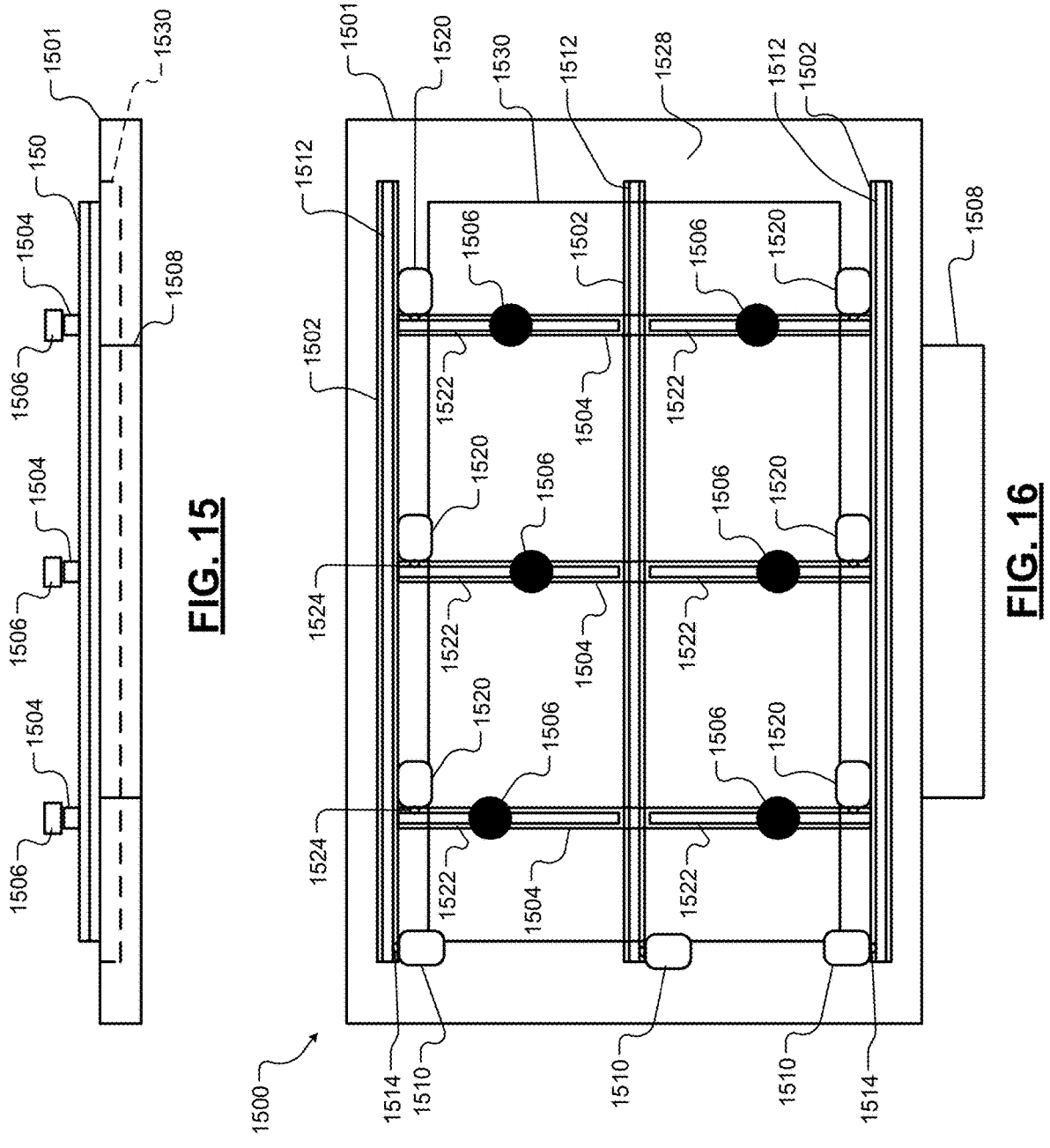
FIGS. 15-16 are side and top views of a fixture assembly including rails, slides, fixturing devices, and a single side gripping extension in accordance with the present disclosure.
Figure 19:
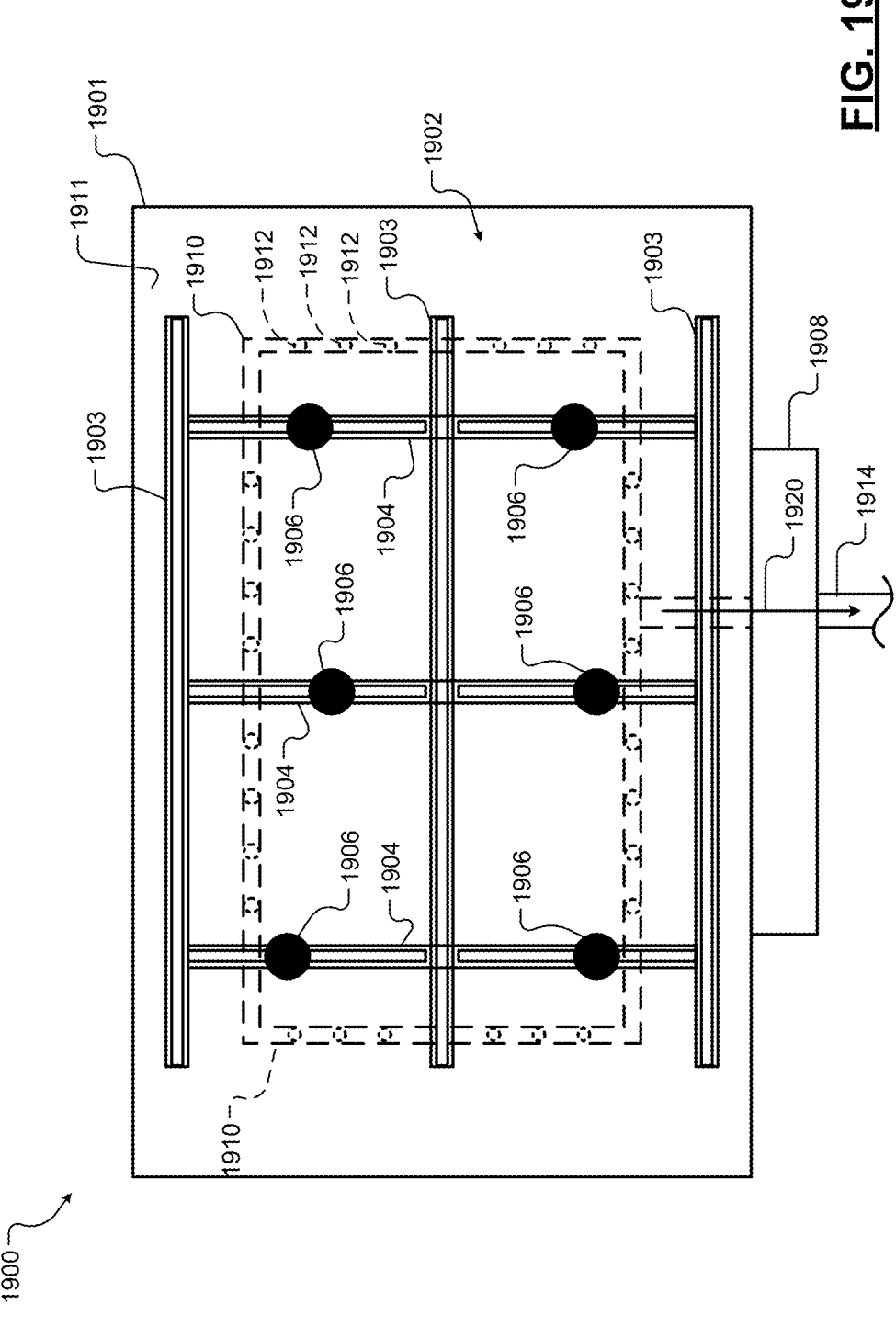
FIG. 19 is a top view of another fixture assembly including a pipeline manifold system in accordance with the present disclosure.

In an embodiment, the fixture base 110 is configured to draw gases and/or vapor from around the object 112. The gases and/or vapor may be drawn into the fixture base 110 and through a line 151 to a holding tank (e.g., a sludge tank). Examples of a fixture assembly that may replace the fixture assembly 106 are shown in FIGS. 15-16 and 19.

Figure 2:
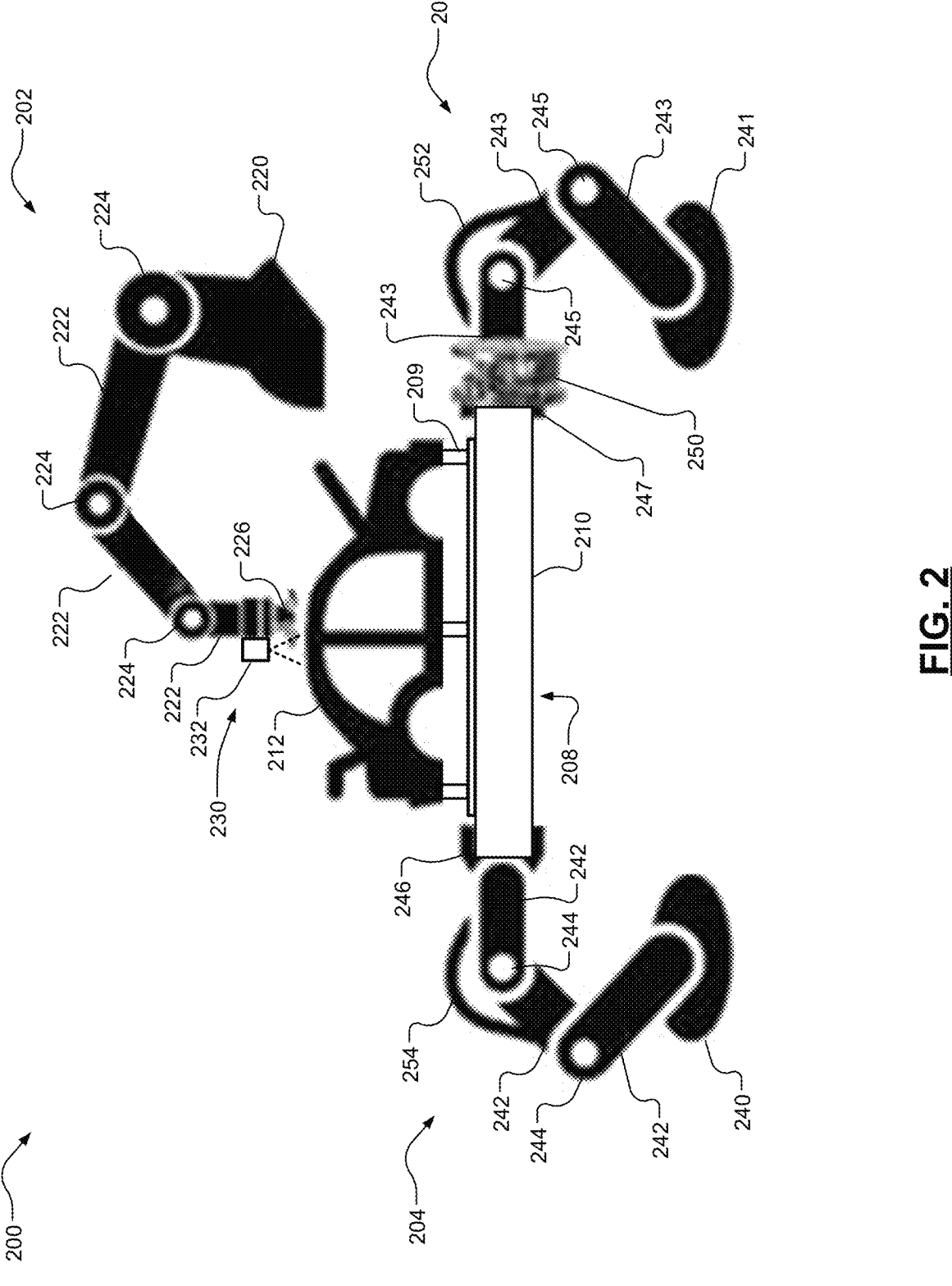
FIG. 2 is a side view of an example of another overspray-free paint system including a paint robot and two fixture lifting and orienting robots in accordance with the preset disclosure.

FIG. 2 shows an overspray-free paint system 200 including a paint robot 202 and two fixture lifting and orienting robots 204, 206 configured to lift and orient a fixture assembly 208. The fixture assembly 208 may include a fixture 209 (e.g., a unibody fixture) that may be mounted on a fixture base 210. The fixture 209 may be configured for a single specific object (e.g., vehicle or BIW) or may be reconfigurable for various different objects (e.g., different vehicles and/or different BIWs). An example object 212 is shown in the form of a vehicle BIW.

The paint robot 202 includes a base 220, robot arms 222, motors 224 and an overspray-free paint applicator 226. The base 220 is in a fixed position, for example, mounted to a floor of a building. Not all of the motors 224 are shown. The paint applicator 226 is able to be moved in X, Y, and Z directions relative to the base 220 and rotated about X, Y, and Z axes providing 6-degrees-of-freedom movement of the paint applicator 226.

The paint robot 202 may further include a vision system 230 installed at the end of the paint robot 202 near the paint applicator 226. The vision system 230 may include one or more cameras (a single camera 232 is shown in FIG. 2). In one embodiment, a single camera is included. In another embodiment, two cameras are included. The cameras may be installed on the paint robot 202 forward of or rearward of the paint applicator 226 such that the cameras are monitoring a surface before and/or after application of paint. The cameras may view the surface being painted prior to, during and/or subsequent to painting of the surface. In an embodiment, a camera is located to view a surface before paint application to feedforward a path of the corresponding robot arm and paint applicator to a control module (e.g., the control module of the paint robot of FIG. 20). A camera located to view the surface after paint application may be used to feedback paint quality to the control module. The control module may adjust a paint process based on the feedback. The control module may monitor paint quality and send a "repair" command to the paint robot 202 to "touch up" paint where indicated.

The lifting and orienting robot 204 includes a base 240, robot arms 242, motors 244 and a gripper 246. The lifting and orienting robot 206 includes a base 241, robot arms 243, motors 245 and a gripper 247. The bases 240, 241 are in fixed positions, for example, mounted to a floor of a building. Not all of the motors 244, 245 are shown. The grippers 246, 247 are configured to grab and hold the fixture base 210. The lifting and orienting robots 204, 206 are configured to operate in a synchronous manner to lift and orient the fixture assembly 208 and one or more objects mounted to the fixture assembly 208. The fixture assembly 208 is able to be moved in X, Y, and Z directions relative to the base 240 and rotated about X, Y, and Z axes providing 6-degrees-of-freedom movement of the fixture assembly 208.

One or more of the lifting and orienting robots 204, 206 may include selective compliance devices. In the example shown, a selective compliance device is installed between the gripper 247 and last one of the arms 243 of the lifting and orienting robot 206. The selective compliance device 250 compensates for when the robots 204, 206 are not moving 100% in synchronization and/or are slightly misaligned. The selective compliance device 250 allows for some movement of the gripper 247 relative to the last one of the arms 243 such that the lifting and orienting robot 206 is not fighting movement by the lifting and orienting robot 204. The selective compliance device 250 is installed at the end of the robot 206 and may be selectively turned ON or OFF based on requirements of different steps in a painting process. When ON, compliance is provided. When OFF, compliance is not provided. The position and/or air pressure of features on the selective compliance device 250 may be tuned to have different impedance gains. The selective and compliance device may include pneumatic devices and receive pressurized air via a supply line, such as line 252. The selective compliance device 250 may include springs, dampeners, linkages, brackets, etc.

Figures 17, 18:
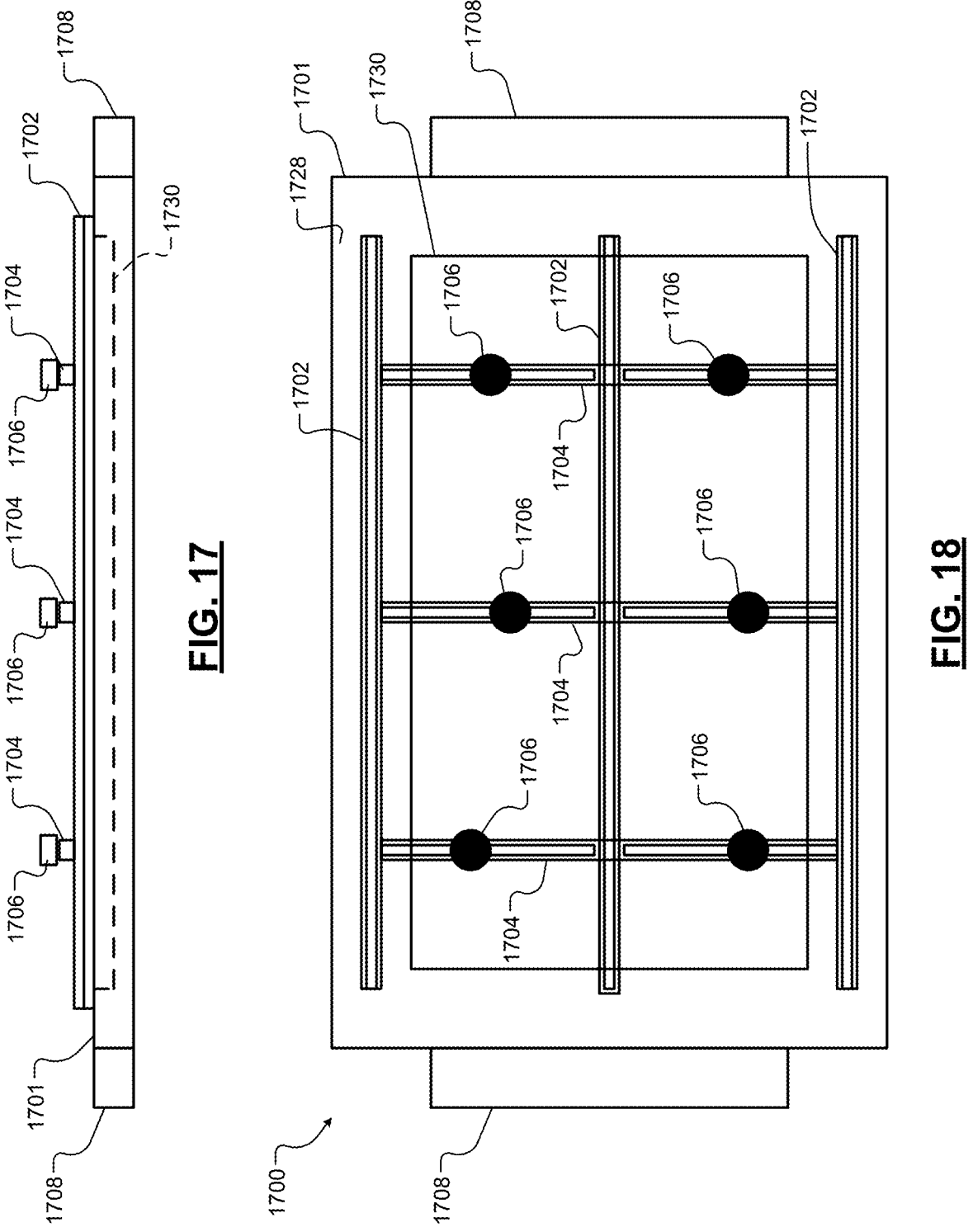
FIGS. 17-18 are side and top views of another fixture assembly including rails, slides, fixturing devices, and dual side gripping extensions in accordance with the present disclosure.

In an embodiment, the fixture base 210 is configured to draw gases and/or vapor from around the object 212. The gases and/or vapor may be drawn into the fixture base 210 and through a line 254 to a holding tank (e.g., a sludge tank). Examples of a fixture assembly that may replace the fixture assembly 208 are shown in FIGS. 17-18. Robot 206 may also include a line for drawing gases and/or vapor from the fixture base 210.

The lifting and orienting robots of FIGS. 1-2 are able to collectively move an object to be painted in various orientations relative to a paint robot. This allows the entire object to be painted via a single paint robot at a single location (or paint booth). As an example, the lifting and orienting robots allow for a whole vehicle and/or BIW to be painted with a single overspray-free paint robot. The lifting and orienting robots are able to move an object to be painted without use of a conveyor.

The lifting and orienting robots may move and orient an object relative to a paint robot and then hold in a static position while a paint applicator is moved relative to the object. The paint applicator may be dynamically moved along the curvature of a surface of the object while, for example, maintaining an equal distance from the surface. The lifting and orienting robots are also able to move and orient the object relative to the paint robot dynamically such that the area of the object being painted remains perpendicular to the direction of the gravitational field. This may include maintaining the orientation and/or position of the paint applicator in a fixed position or moving the paint applicator in a synchronized manner with movement of the object by the lifting and orienting robots.

The lifting and orienting robots of FIGS. 1-2 provide six degrees-of-freedom movement including movement in X, Y and Z directions and rotation about X, Y and Z axes. The X direction refers to movement in forward and rearward directions. The X direction may refer to the forward (or front) and rearward (or back) direction relative to the object being painted. The Y direction refers to movement in left and right directions relative to the object being painted. The Z direction refers to movement in up and down directions. Rotation about the X axis refers to roll. Rotation about the Y axis refers to pitch. Rotation about the Z axis refers to yaw.

Figure 4:
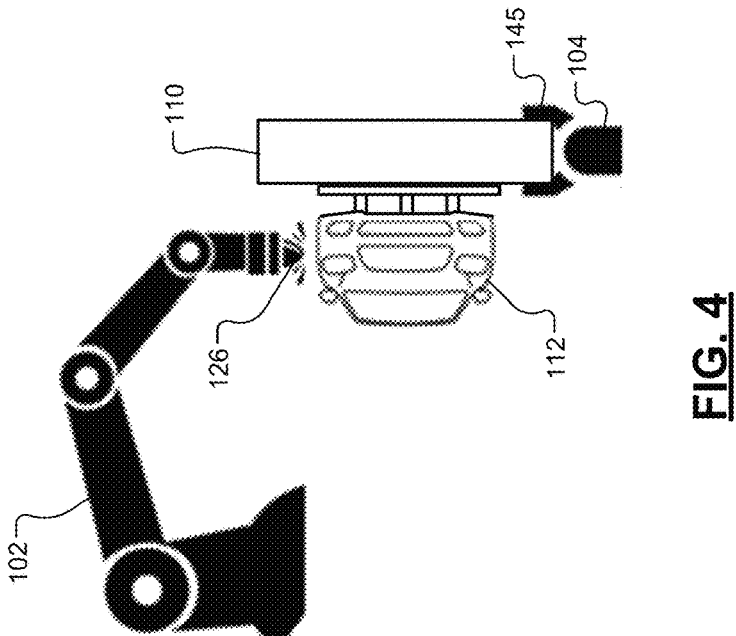
FIG. 4 is a front view of the overspray-free paint system of FIG. 1 including the fixture lifting and orienting robot with the gripper in a vertical state for painting a driver side surface of the vehicle.
Figure 3:
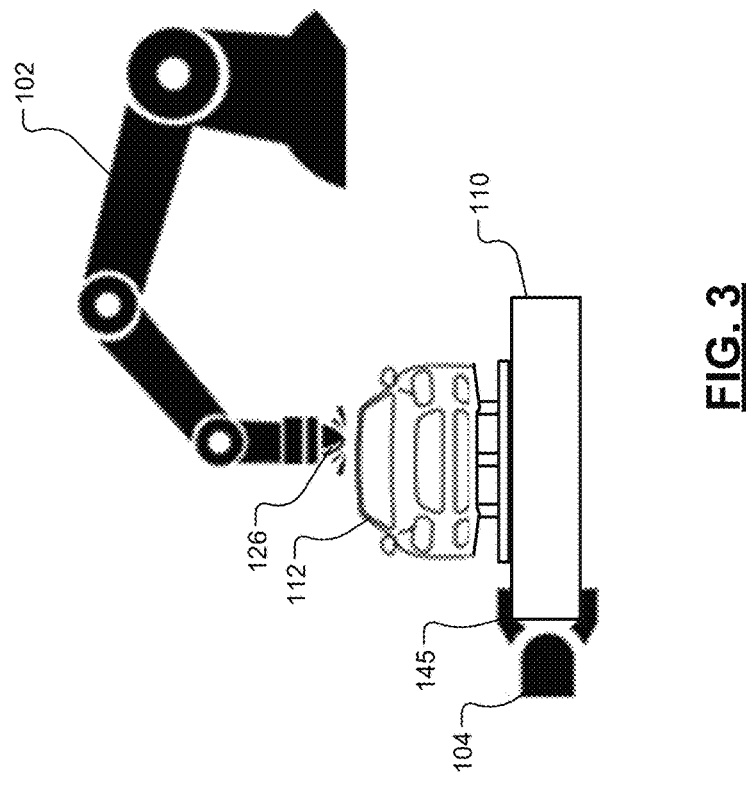
FIG. 3 is a front view of the overspray-free paint system of FIG. 1 including the fixture lifting and orienting robot with a gripper in upward horizontal state for painting a top surface of a vehicle.
Figure 6:
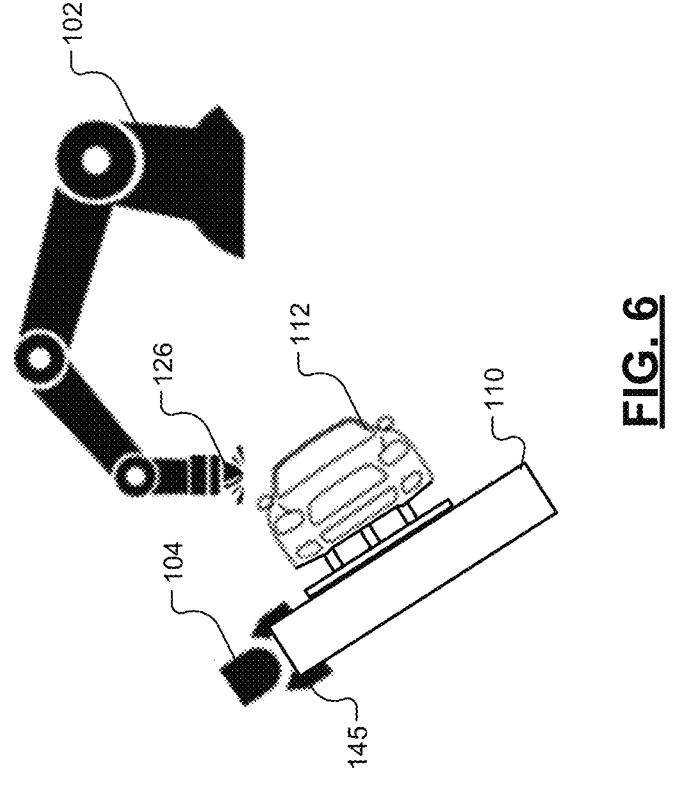
FIG. 6 is a front view of the overspray-free paint system of FIG. 1 including the fixture lifting and orienting robot with the gripper in an angled state for painting a passenger side pillar of the vehicle.
Figure 5:
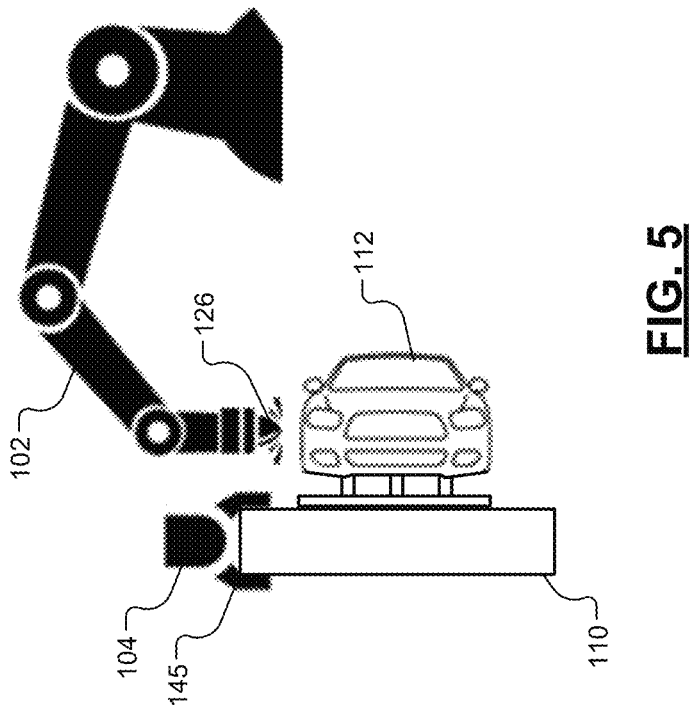
FIG. 5 is a front view of the overspray-free paint system of FIG. 1 including the fixture lifting and orienting robot with the gripper in another vertical state for painting a passenger side surface of a vehicle.
Figure 7:
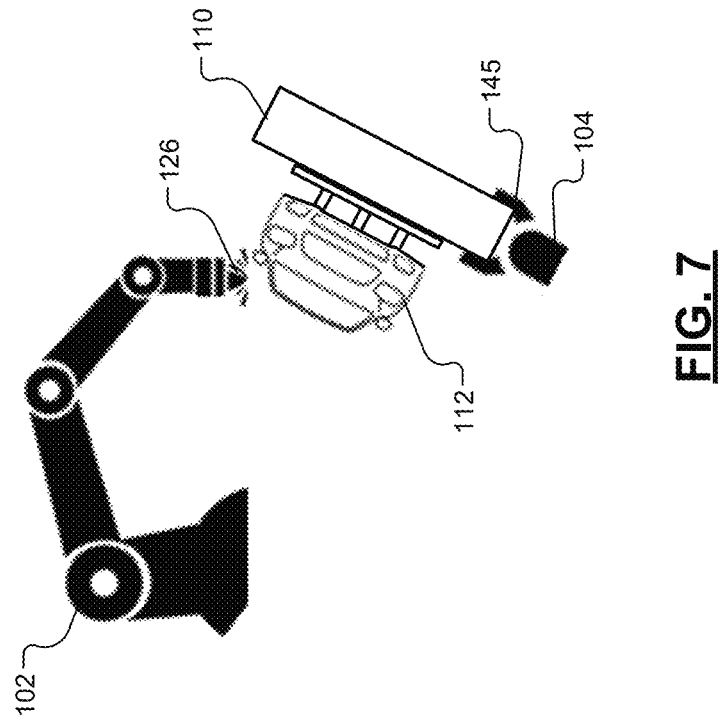
FIG. 7 is a front view of the overspray-free paint system of FIG. 1 including the fixture lifting and orienting robot with the gripper in another angled state for painting a driver side pillar of the vehicle.

FIGS. 3-7 show the overspray-free paint system of FIG. 1 including the fixture lifting and orienting robot 104 with the gripper 145 in different positions and orientations relative to the paint robot 102 and/or paint applicator 126. The gripper 145 is used to grab, lift and orient the fixture base 110 on which the object 112 is mounted. FIG. 3 shows the gripper 145 in an upward horizontal state for painting a top surface of the object 112. FIG. 4 shows the gripper 145 in a vertical state for painting a driver side surface of the object 112. FIG. 5 shows the gripper 145 in another vertical state for painting a passenger side surface of the object 112. FIG. 6 shows the gripper 145 in an angled state for painting a passenger side pillar of the object 112. FIG. 7 shows the gripper 145 in another angled state for painting a driver side pillar of the object 112.

FIGS. 8-13 show the overspray-free paint system 200 of FIG. 2 including the fixture lifting and orienting robots 204, 206 with grippers 246, 247 in different positions and orientations relative to the paint robot 202 and/or paint applicator 226. The grippers 246, 247 are used to grab, lift and orient the fixture base 210 on which the object 212 is mounted.

Figure 8:
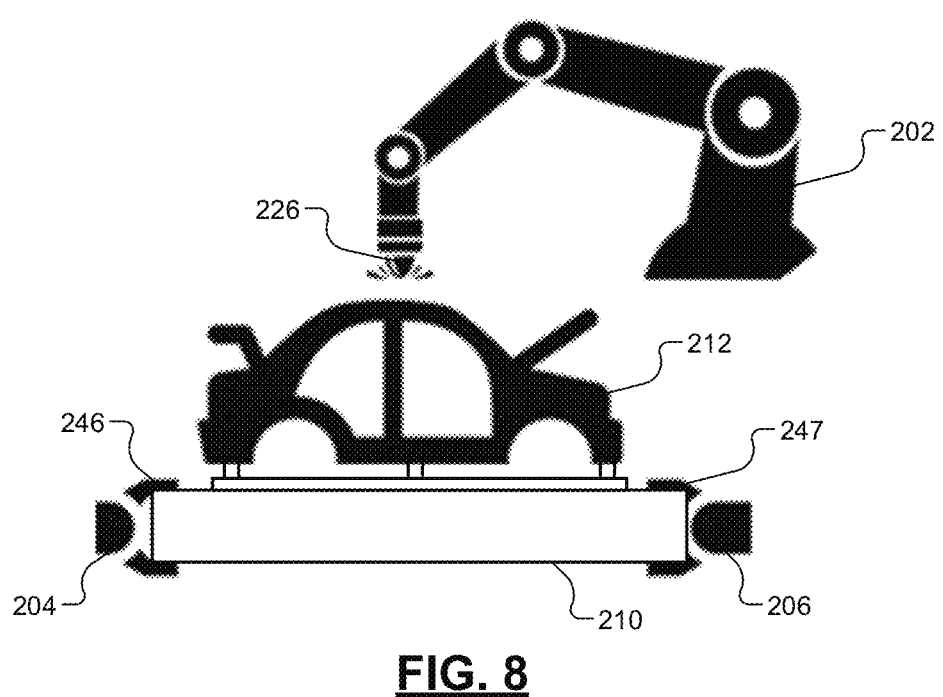
FIG. 8 is a side view of the overspray-free paint system of FIG. 2 including the fixture lifting and orienting robots with grippers in horizontal states for painting a top and/or horizontally oriented surface of a BIW.
Figure 9:
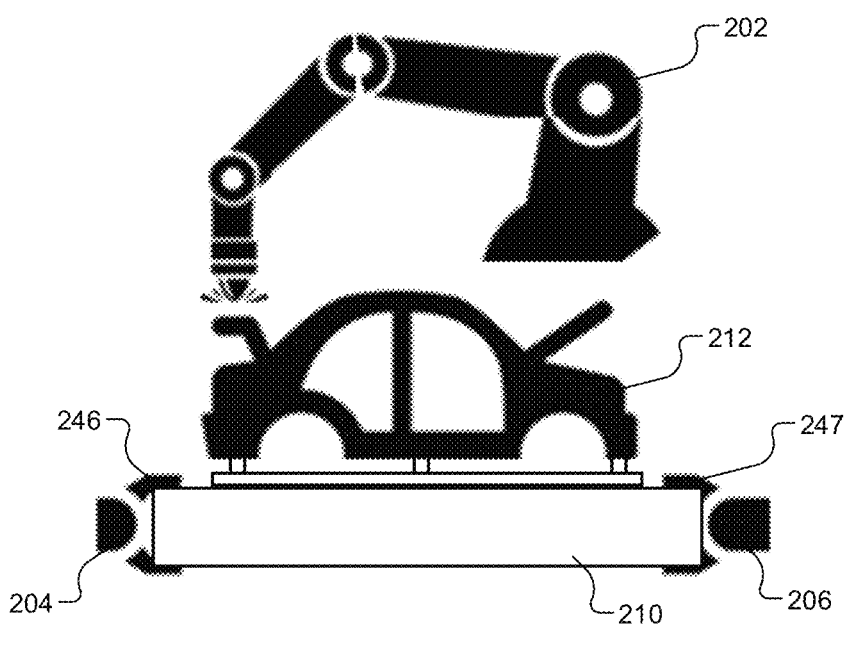
FIG. 9 is a side view of the overspray-free paint system of FIG. 2 including the fixture lifting and orienting robots with grippers in horizontal states but shifted relative to the paint robot to paint another horizontally oriented surface of the BIW.
Figure 10:
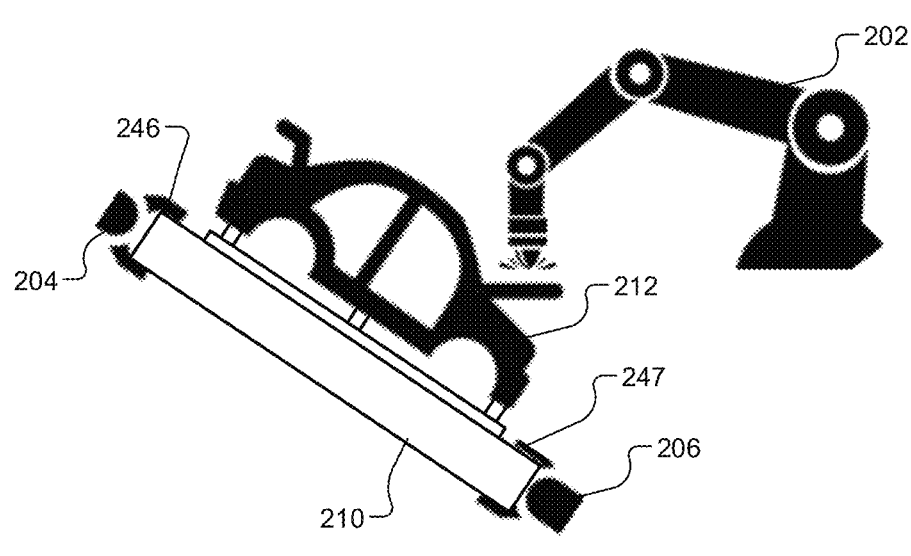
FIG. 10 is a side view of the overspray-free paint system of FIG. 2 including the fixture lifting and orienting robots with grippers in angled states to paint another horizontally oriented surface of the BIW.
Figure 11:
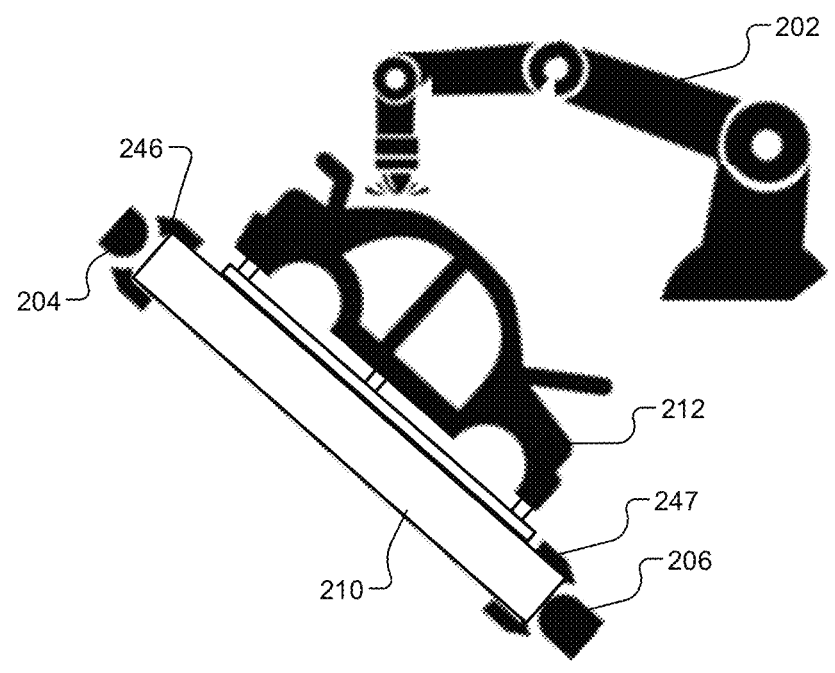
FIG. 11 is a side view of the overspray-free paint system of FIG. 2 including the fixture lifting and orienting robots with grippers in angled states but shifted relative to the paint robot to paint another horizontally oriented surface of the BIW.
Figure 12:
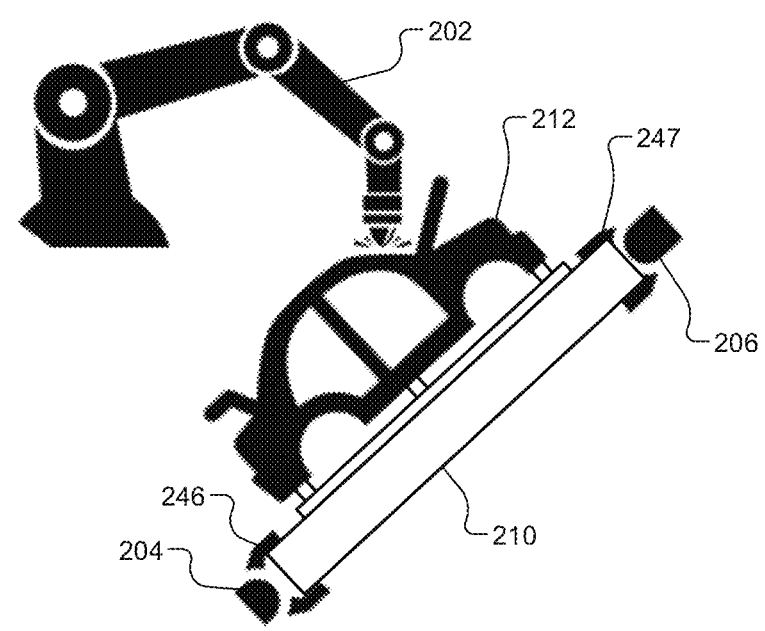
FIG. 12 is a side view of the overspray-free paint system of FIG. 2 including the fixture lifting and orienting robots with grippers in other angled states to paint another horizontally oriented surface of the BIW.
Figure 13:
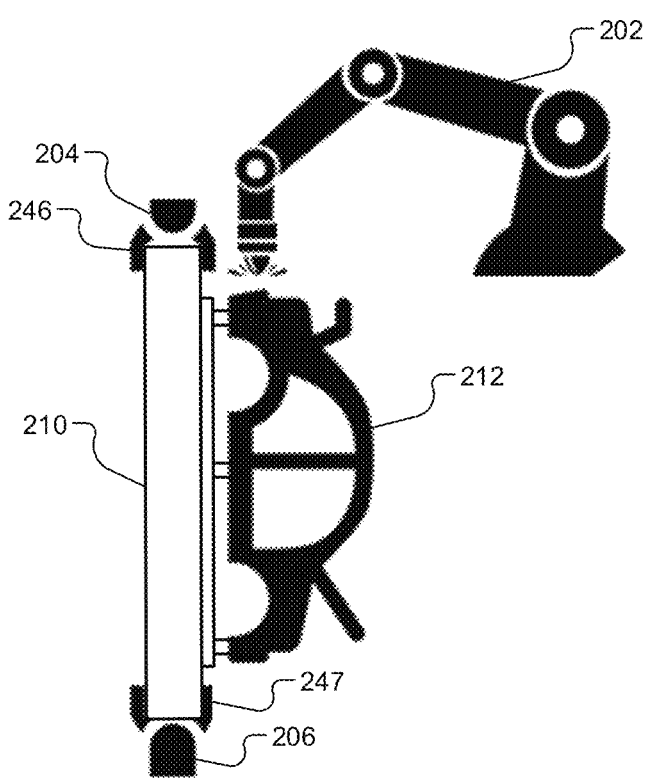
FIG. 13 is a side view of the overspray-free paint system of FIG. 2 including the fixture lifting and orienting robots with grippers in vertical states to paint a rear end surface of the BIW.

FIG. 8 shows the grippers 246, 247 in horizontal states for painting a top and/or horizontally oriented surface of the object 212. FIG. 9 shows the grippers 246, 247 in horizontal states but shifted relative to the paint robot 202 to paint another horizontally oriented surface of the object 212. FIG. 10 shows the grippers 246, 247 in angled states to paint another horizontally oriented surface of the object 212. FIG. 11 shows the grippers 246, 247 in angled states but shifted relative to the paint robot to paint another horizontally oriented surface of the object 212. FIG. 12 shows the grippers 246, 247 in other angled states to paint another horizontally oriented surface of the object 212. FIG. 13 shows the grippers 246, 247 in vertical states to paint a rear end surface of the object 212.

Figure 14:
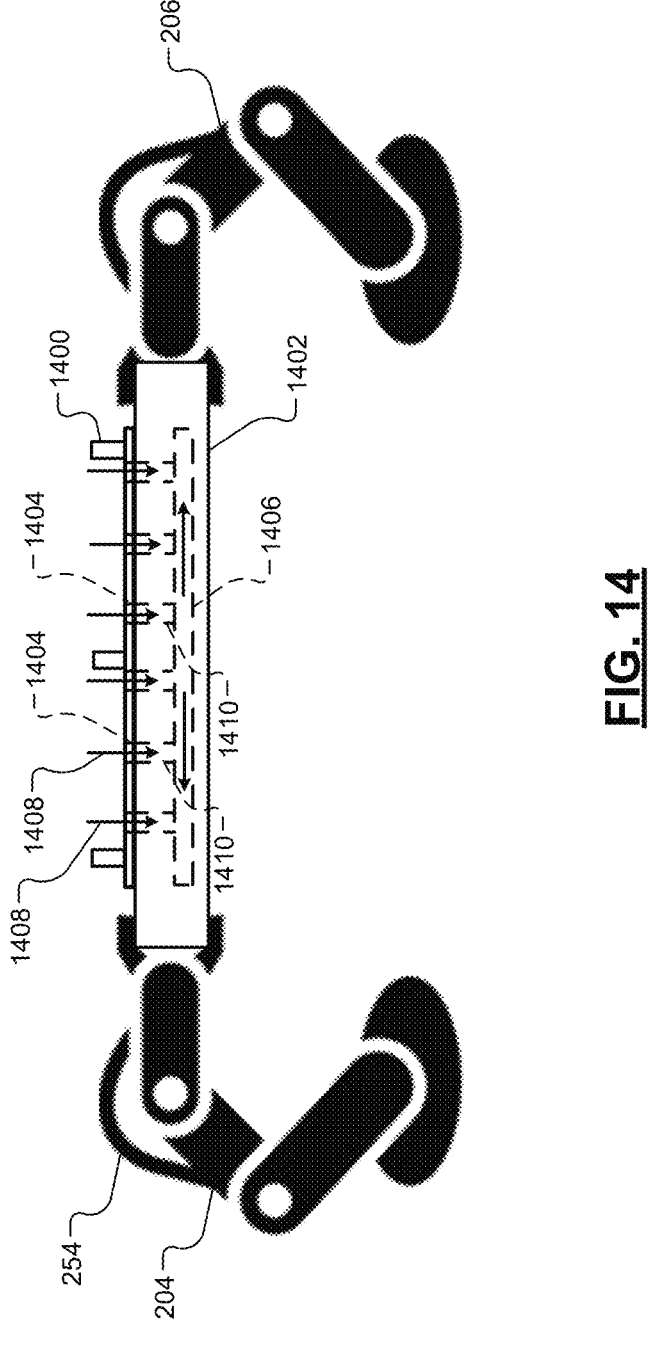
FIG. 14 is a side view of the fixture lifting and orienting robots of FIG. 2 illustrating draw of gases and/or vapor through a fixture being lifted in accordance with the present disclosure.

FIG. 14 shows the fixture lifting and orienting robots 204, 206 of FIG. 2 illustrating draw of gases and/or vapor through a fixture 1400 and a fixture base 1402 being lifted by the robots 204, 206. The fixture 1400 may include holes 1404 for passage of gases and/or vapors from within a paint booth. This may include drawing any overspray from a paint applicator. Although the paint applicators of FIGS. 1-13 are referred to as overspray-free applicators, a minimal or negligible amount of overspray may occur, which may be drawn through the holes 1404 in the fixture 1400 and into a cavity and/or channel 1406 in the fixture base 1402. This is represented by arrows 1408. Example cavities are shown in FIGS. 15-18. An example channel is shown in FIG. 19. A set of local suction ports 1410 extend from the holes 1404 to the cavity and/or channel 1406 in the fixture base 1402. The cavity and/or channel 1406 are integrated into a vacuum piping system on the robotic lifter system provided by the robots 204, 206. The vacuum piping system is connected to the lifting and orienting robots 204, 206 to enable improved collection of any overspray. The vacuum piping system includes the holes 1404, the ports 1410, the cavity and/or channel 1406 and one or more vacuum lines on the robots 204, 206 such as the vacuum line 254.

FIGS. 15-16 show a fixture assembly 1500 including a fixture base 1501, rails 1502, slides 1504, fixturing devices 1506, and a single side gripping extension 1508. An object being painted may be held by the fixturing devices 1506, which may include clamps, pins, etc. The slides 1504 may be independently moved along the rails 1502 via the motors 1510. The motors 1510 may be coupled to linear gears 1512 extending along the rails 1502 via circular gears 1514. The fixturing devices 1506 may be independently moved along the slides 1504 via motors 1520. The motors 1520 may be coupled to linear gears 1522 via circular gears 1524. A cavity 1530 exists in a body 1528 of the fixture base 1501. Gases and/or vapor is drawn into and out of the cavity 1530. A control module (e.g., the control module of one of the lifting and orienting robots of FIG. 20) may control movement and positioning of the slides 1504 relative to the rails 1502, movement and positioning of the fixturing devices 1506 relative to the slides 1504, and state of clamps of the fixturing devices 1506. The clamps may be electrically, hydraulically and/or pneumatically actuated.

FIGS. 17-18 show another fixture assembly 1700 including a fixture base 1701, rails 1702, slides 1704, fixturing devices 1706, and dual side gripping extensions 1708. The fixture assembly 1700 may be configured similarly as the fixture assembly 1500 of FIGS. 15-16, except include two gripping extensions for two lifting and orienting robots. An object being painted may be held by the fixturing devices 1706, which may include clamps, pins, etc. The slides 1704 may be independently moved along the rails 1702 via motors (e.g., the motors 1510 of FIG. 16). The motors may be coupled to linear gears extending along the rails via circular gears. The fixturing devices 1706 may be independently moved along the slides 1704 via motors. The motors may be coupled to linear gears via circular gears. A cavity 1730 exists in a body 1728 of the fixture base 1701. Gases and/or vapor is drawn into and out of the cavity 1730. A control module (e.g., the control module of one of the lifting and orienting robots of FIG. 20) may control movement and positioning of the slides 1704 relative to the rails 1702, movement and positioning of the fixturing devices 1706 relative to the slides 1704, and state of clamps of the fixturing devices 1706. The clamps may be electrically, hydraulically and/or pneumatically actuated.

FIG. 19 shows another fixture assembly 1900 including a fixture base 1901, a pipeline manifold system 1902, rails 1903, slides 1904, fixturing devices 1906, and a single side gripping extension 1908. The pipeline manifold system 1902 includes: a channel 1910 embedded in a body 1911 of the fixture 1900; input ports 1912, and an output channel 1914. Gases and/or vapor are drawn from an area above the fixture 1900 through the input ports 1912, into the channel 1910, and then sent out through the output channel 1914, as represented by arrow 1920. The output channel 1914 may refer to the vacuum line 254 of FIG. 2. The input ports 1912 provide local suction flow in the fixture base 1901 for increased suction near a corresponding overspray-free paint applicator and transfer efficiency of gases and/or vapors creating due to painting by the overspray-free paint applicator. The gases and/or vapors may be drawn from the fixture assembly 1900, through one or more vacuum lines on one or more fixture robots to one or more holding tanks separate from the fixture assembly 1900.

Figure 20:
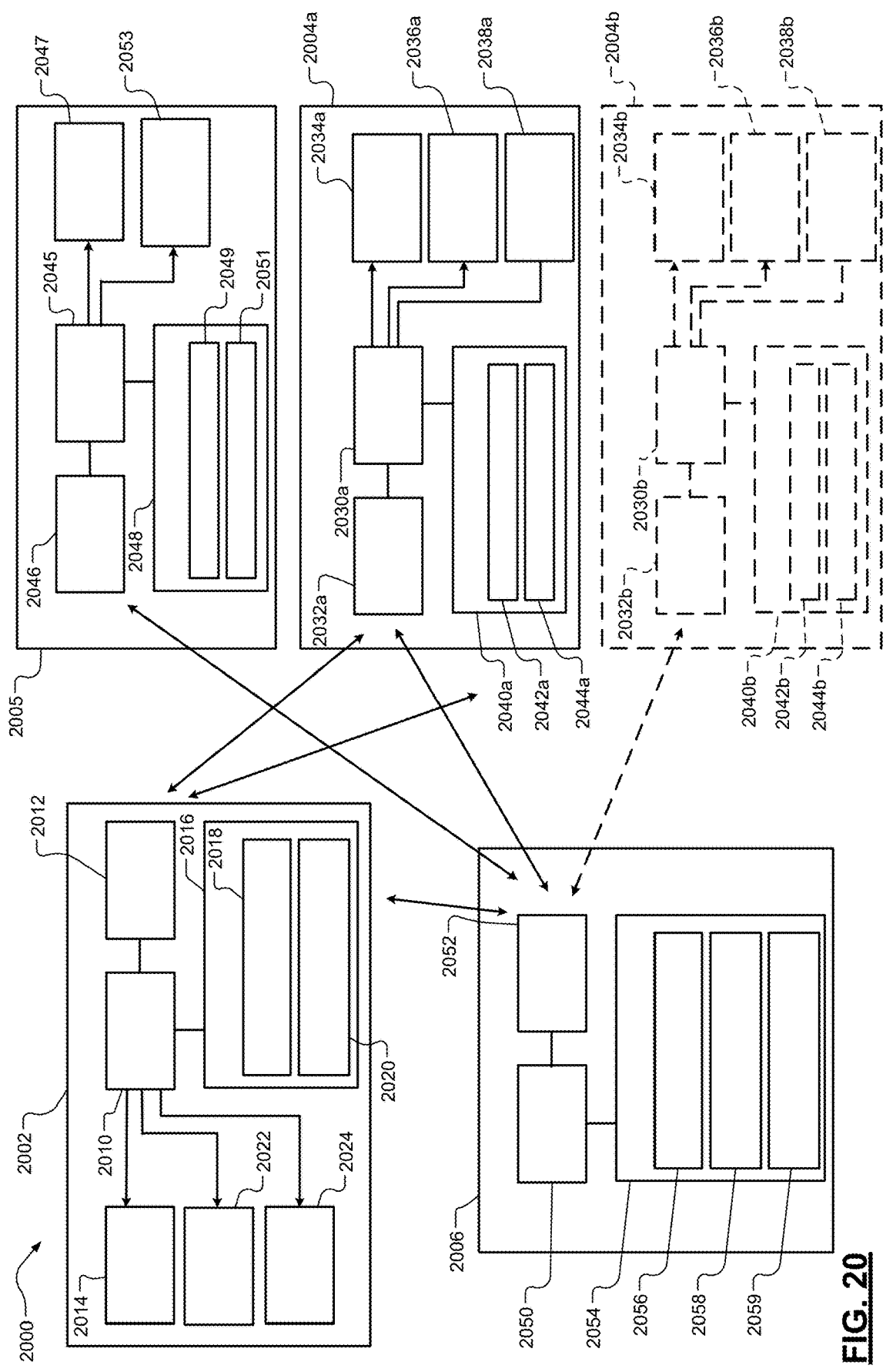
FIG. 20 is a functional block diagram of another overspray-free paint system in accordance with the present disclosure.

FIG. 20 shows another overspray-free paint system 2000 may include the overspray-free paint system 100 of FIG. 1, the overspray-free paint system 200 of FIG. 2, and/or one of the fixtures (or fixture bases) of FIGS. 15-19. The overspray-free paint system 2000 includes a paint robot 2002, one or more lifting and orienting robots 2004, a fixture assembly 2005, and may include a central monitoring station 2006.

The paint robot 2002 may include a control module 2010, a transceiver 2012, motors 2014, and memory 2016. The memory 2016 may store a guidance program 2018 and object information 2020. The guidance program 2018 may be implemented to control the motors 2014 and movement of an overspray-free paint applicator 2022. This may be based on the object information 2020, such as object location, size, orientation, surface dimensions, etc. The paint robot 2002 may also include a vision system 2024, which is controlled by the control module 2010. The vision system 2024 may be used to monitor location and operation of the paint applicator 2022 relative to the object surface being painted. The vision system 2024 may provide feedback information to the control module 2010, which may be used to adjust the location, orientation, spray pattern, paint pressure and/or flow rate, etc. of the paint applicator 2022. The feedback information may also include images of the surface being painted, which may be evaluated by the control module 2010 and/or the control module 2050. The adjustments may be made by the control modules 2010, 2030 and/or 2050. This may include adjusting position and/or orientation of the object being painted and/or a subsequent object being painted.

The vision system 2024 may include one or more cameras. As an example, the vision system 2024 may include a first camera forward of the paint applicator 2022 and a second camera rearward of the paint applicator relative to a direction at which the paint applicator 2022 is moving and painting. The camera located forward of the paint applicator 2022 (or before paint application) may be used to feedforward a path of the paint robot 2002 and paint applicator 2022 to maintain the paint applicator 2022 normal to the surface being painted. The camera located rearward of the paint applicator 2022 (or after paint application) may be used to a) feedback paint quality and adjust the paint process b) monitor paint quality and send a "repair" command to the control module 2010 to "touch up" paint where needed.

Each of the lifting and orienting robots 2004 may include a control module 2030, a transceiver 2032, a pump, 2034, actuators 2036, a power source 2038, and a memory 2040. The elements for a first robot 2004a are designated with 'a' in FIG. 20. The elements for a second robot 2004b are designated with 'b' in FIG. 20. The memory 2040 may store a guidance program 2042 and object information 2044. The control module 2030 controls movement of the robot 2004 and may control operation of the pump 2034 and the actuators 2036. The actuators 2036 may include motors to move arms of the robot 2004, motors to actuate grippers, etc. The actuators 2036 may be electrically, hydraulically and/or pneumatically actuated. The guidance program 2042 may be implemented to control the pump 2034 and the actuators 2036 to control speed and movement of a fixture relative to the paint robot 2002 and/or the overspray-free paint applicator 2022. This may be based on the object information 2044, such as object location, size, orientation, surfaces to be painted, dimensions of the surfaces, etc. The object information 2044 may also include object weight, center of gravity, etc., which may be used to control power, voltage, current, air pressure, hydraulic pressure, and/or other parameters used to determine position, orientation, and/or movement speed of a fixture.

The fixture assembly 2005 may include a control module 2045, a transceiver 2046, actuators 2047, and/or memory 2048, which may store a fixture program 2049 and/or object information 2051. The actuators 2047 may include motors to move slides and/or fixturing devices, motors to actuate clamps, etc. Some or all of the actuators 2047 may be powered by the power source 2053, which may include one or more battery packs, or may be hydraulically or pneumatically actuated. In one embodiment, power, hydraulic fluid and/or air pressure for actuating the actuators 2047 is provided by one of the lifting and orienting fixture robots 2004. The fixture program 2049 may be executed by the control module 2045 to move slides and fixturing devices to clamp down an object being painted to the fixture assembly. In another embodiment, the moving of the slides and fixturing devices and the clamping down of an object are controlled by one of the control modules 2030, 2050. Although the fixturing program 2049 is shown as being stored in the memory 2048, it may be stored in one of the memories 2040, 2054. The stated movement and actuation may be based on the object information 2051, such as object location, size, orientation, object structures to be clamped, dimensions of object structures, etc.

The central monitoring station 2006 may include a control module 2050, a transceiver 2052, and a memory 2054. The memory 2054 may store object information 2056 for the paint robot 2002 and object information 2058 for the robot (s) 2004, and object information for the fixture assembly 2059. The object information 2056 may include the object information 2020. The object information 2058 may include the object information 2044. The object information 2059 may include the object information 2051. The central monitoring station 2006 may monitor and/or remotely control operations of the paint robot 2002 and/or the robots 2004.

This may include monitoring and/or controlling activation, deactivation, guidance program initiation, paint start and stop times, movements of the paint applicator 2022, operation of the pump(s) 2034, operation and/or movement of the actuators 2036, 2047, etc.

The control modules 2010, 2030 and 2050 may be in communication with each other and/or operate independently. The control modules 2010, 2030 move the overspray-free paint applicator 2022 and a fixture on which an object is mounted to be painted independently and in a coordinated manner to facilitate overspray-free paint operation. The control modules 2010, 2030 may be synchronized and/or perform operations based on a provided start time and/or a global clock signal. The global clock signal may be shared with the control modules 2010, 2030, 2050. The control module 2050 may provide the global clock signal and/or a timing signal to the control modules 2010, 2030 to synchronize the control modules 2010, 2030. The control modules 2010, 2030 move the paint applicator 2022 and the fixture in a synchronized manner to prevent the paint applicator 2022 from coming in contact with the object being painted and control the location of the paint applicator 2022 relative to a surface of the object. The motions of the robots 2002, 2004 and fixture assembly 2005 may be programmed. The motions of the robots 2004 may include up, down pan, tilt and rotate.

The robots 2002, 2004 provide a robotic lifter system that is able to position a vehicle body at any given orientation, hence, to make any one of a vehicle's body surfaces perpendicular to gravitational field for overspray-free paint operation. The paint robot 2002 and the fixture robots 2004 are configured to maintain a perpendicular relationship between a direction of paint flow out of the overspray-free paint applicator 2022 and a surface of the object being painted. The fixture robots 2004 are configured to maintain a perpendicular relationship between a direction of the gravitational field at the fixture assembly 2005 and the surface of the object being painted.

In an embodiment, a vehicle body orientation is positioned statically, whereas paint sprayer nozzle's orientation is dynamically adjusted along the curvature of the surface being painted. In another embodiment, A vehicle body orientation is positioned dynamically such that the area being painted remains perpendicular to gravitational field (i.e., nozzle's orientation is fixed). In yet another embodiment, both a vehicle body and a paint sprayer nozzle are moved in a synchronized and coordinated fashion.

The fixture robot 2004b may include a selective compliance device installed at the end of a last arm of the fixture robot 2004b, as shown in FIG. 2. The selective compliance device may be selectively transitioned between "ON" and "OFF" states based on the requirements of the different steps in a painting process. The position or air pressure of features of the selective compliance device may be tuned based on different impedance gains, which may be controlled by the control module 2030b.

Figure 21:
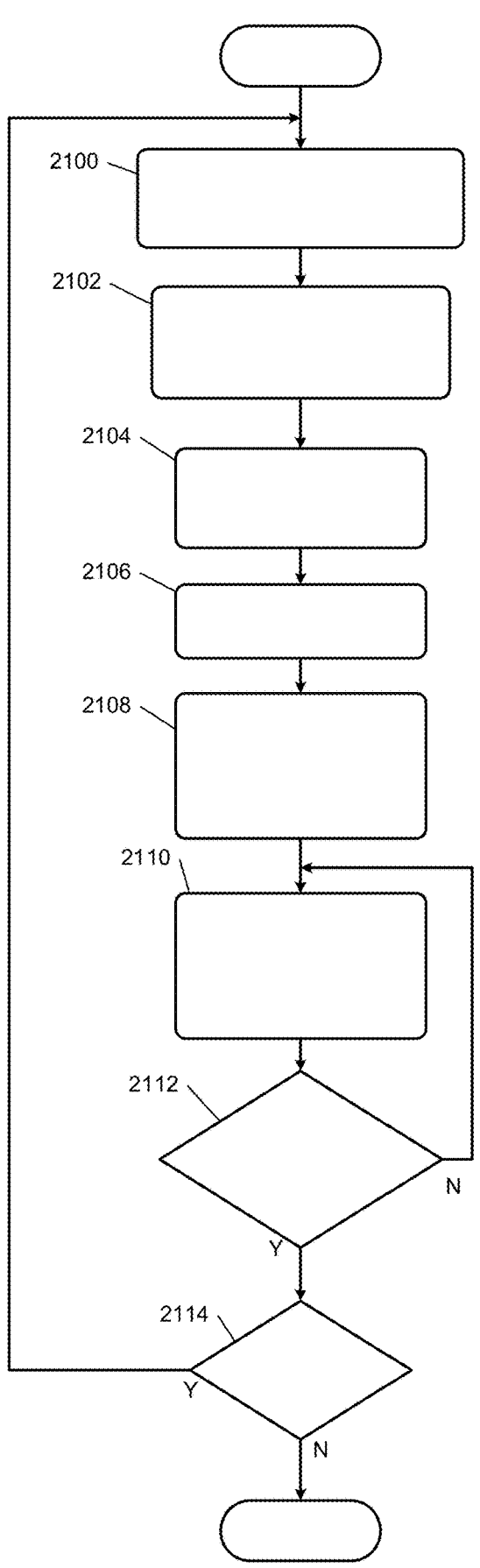
FIG. 21 illustrates a method of operating an overspray-free paint system of FIG. 14 in accordance with the present disclosure.

FIG. 21 shows a method of operating an overspray-free paint system of FIG. 20. The operations may be iteratively performed and performed by the control modules 2010, 2030, 2045, 2050. At 2100, the control module 2050 may obtain fixture and object information, such as fixture assembly information for a fixture assembly 2005 (or other one of the fixture assemblies disclosed herein) and vehicle and/or BIW information for the paint robot 2002 (or other paint robot disclosed herein) and one or more of the robots 2004 (or other fixture robot disclosed herein). The fixture information may include any of the above-stated fixture information. The object information may include any of the above-stated object information including surfaces to be painted, size, shape and locations of the surfaces on the object being painted, clamping locations of the object, etc.

At 2102, the control module 2050 may transmit via the transceiver 2052 the fixture information and the object information to the paint robot 2002, the fixture assembly 2005, and the one or more fixture robot(s) 2004. In another embodiment, this information is stored at the robots 2002, 2004 and fixture assembly 2005 and selected based on an indication signal, for example, from the control module 2050 indicating the object being painted and/or the fixture assembly being used.

At 2104, the one or more fixture robot(s) 2004 may move slides, fixturing devices, clamps, etc. of a fixture assembly to hold an object to be painted.

At 2106, the object being painted is mounted to the fixture assembly 2005. This may include the control module 2045 or other control module clamping down an object set on the fixture assembly 2005.

At 2108, the control module 2050 may signal the paint robot 2002 and the one or more fixture robots 2004 to initiate the paint process and start the ventilation system, which may draw gases and/or vapor through the fixture assembly 2005. The paint robot 2002 and the fixture robots 2004 may then position the paint applicator 2022 and the object being painted to starting positions and orientations.

At 2110, the control module 2050 may monitor and/or control the painting process including movement of the paint robot 2002 and/or the fixture robots 2004 via communication with the paint robot 2002 and/or the fixture robots 2004. The paint robot 2002 and the fixture robots 2004 may autonomously move the paint applicator 2022 and/or the fixture assembly 2005 to paint surfaces of the object or this may be controlled by the central monitoring station 2006.

At 2112, the control module 2050 may determine whether the paint process is completed for the current object being painted. If yes, operation 2114 may be performed, otherwise operation 2108 may be performed. At 2114, the control module 2050 may determine whether there is another object to be painted. If yes, this method may be repeated for the next object, otherwise the method may end.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples set forth herein include a robotic system integrated an overspray-free paint robot and one or more fixture lifting and orienting robots, which are configured to position objects at any orientation. The examples include gripping underbody fixtures and conducting various motions up, down, pan, tilt, rotate, etc. to position a vehicle body and any given orientation and making any one of a vehicle's body surfaces perpendicular to gravitational filed for overspray-free paint operation. This is done using high transfer efficient overspray-free paint applicators to paint entire surfaces of bodies of objects (e.g., all surfaces of an entire vehicle body). This is also done using one or more fixture robots.

The examples set forth herein include lifter systems able to orient a vehicle body to a static positioned while having a overspray-free paint nozzle (or applicator) for spraying be oriented and moved dynamically along the curvature of a surface being painted. The lifter systems are also able to orient and move a vehicle body dynamically such that the area being painted remains perpendicular to a direction of a gravitational field while maintaining a corresponding over-spray-free paint nozzle (or applicator) in a fixed orientation and position. The overspray-free paint systems disclosed herein also are configured to move both a vehicle body and paint applicator in a synchronized and coordinated fashion to, for example, maintain one or more predetermined distances between the paint applicator and surfaces being painted.

The example fixture assemblies disclosed herein are configured for locating and clamping one or more types of vehicle underbodies. The fixture assemblies are reconfigurable for different types of vehicle underbodies. Fixturing devices are able to be moved to various locations for clamping various types of vehicle underbodies. The fixturing devices may include reconfigurable locating pins and/or clamps for locating and clamping various types of vehicle underbodies. The reconfigurable locating pins and clamps are real-time automatically adjusted according to the footprint and size of the vehicle body (or underbody) and corresponding locating and clamping scheme of the vehicle body to be painted.

The examples set forth herein provide an enabler for micro/mini-factory designed for low volume vehicle production without tradition paint shop infrastructure. The examples enable a sustainable coating process that has no oven, no sludge tank, and/or no emissions. The examples allow for use of a single overspray-free paint applicator to be used to paint an entire vehicle body at a single location.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An overspray-free paint system comprising:
a paint robot comprising an overspray-free paint applicator;
a fixture assembly configured to hold an object, which is to be painted by the overspray-free paint applicator, in a fixed position relative to the fixture assembly;
a first fixture robot configured to lift and orient the fixture assembly relative to at least one of the paint robot and the overspray-free paint applicator, the first fixture robot comprising a first gripper configured to grab a first portion of the fixture assembly, and the first fixture robot configured to lift and orient the fixture assembly via the first gripper,
wherein the fixture assembly comprises slides and fixturing devices configured to clamp down the object to a fixture base of the fixture assembly;
a pump; and
a first control module configured to control operation of the pump to draw at least one of a gas or a vapor through the fixture assembly.

2. The overspray-free paint system of claim 1, further comprising a second control module configured to adjust at least one of position and operation of the overspray-free paint applicator based on feedback,
wherein the paint robot comprises a vision system configured to at least one of monitor movement and painting of the overspray-free paint applicator and provide the feedback to the second control module.

3. The overspray-free paint system of claim 1, wherein:
the paint robot comprises a second control module; and the first fixture robot comprises the first control module configured to communicate with and synchronize timing with the second control module.

4. The overspray-free paint system of claim 1, wherein the first fixture robot is configured to adjust roll and pitch of the fixture assembly and the object such that surfaces of the object to be painted are horizontal and perpendicular to the overspray-free paint applicator when painted.

5. The overspray-free paint system of claim 1, further comprising a second fixture robot configured to grab, position and orient the fixture assembly in cooperation with the first fixture robot.

6. The overspray-free paint system of claim 1, wherein:
the paint robot provides six degrees-of-freedom movement of the overspray-free paint applicator; and
the first fixture robot provides six degrees-of-freedom movement of the fixture assembly and the object.

7. The overspray-free paint system of claim 1, wherein the paint robot and the first fixture robot are configured to position and orient the overspray-free paint applicator and the fixture assembly to maintain the overspray paint applicator in a perpendicular arrangement relative to curved surfaces of the object being painted.

8. The overspray-free paint system of claim 1, wherein:
the object is at least one of a vehicle component and a body-in-white, and
the first fixture robot is configured to move the at least one of the vehicle component and the body-in-white in X, Y, Z directions relative to the paint robot and adjust roll, pitch and yaw of the at least one of the vehicle component and the body-in-white relative to a base of the first fixture robot.

9. The overspray-free paint system of claim 1, wherein:
the fixture assembly comprises a side gripping extension; and
the first gripper is configured to grab the side gripping extension.

10. The overspray-free paint system of claim 1, wherein the fixture assembly comprises actuators configured to independently move the slides and the fixturing devices relative to the fixture base.

11. The overspray-free paint system of claim 1, wherein the fixture base comprises at least one of a cavity and a channel for through which the at least one of the gas or the vapor pass is drawn via the pump.

12. An overspray-free paint system comprising:
a paint robot comprising an overspray-free paint applicator;
a first fixture robot for lifting and orienting a fixture assembly relative to at least one of the paint robot and the overspray-free paint applicator, the fixture assembly configured to hold an object to be painted by the overspray-free paint applicator, the first fixture robot comprising a first gripper configured to grab a first portion of the fixture assembly, and the first fixture robot configured to lift and orient the fixture assembly via the first gripper; and
a second fixture robot configured to grab, position and orient the fixture assembly in cooperation with the first fixture robot, wherein the second fixture robot comprises
a second gripper configured to grab a second portion of the fixture assembly; and
a selective compliance device connected between an arm of the second fixture robot and the second gripper and configured to compensate for misalignment between the first gripper and the second gripper.

* * * * *